(12) United States Patent
Hurren et al.

(10) Patent No.: US 8,108,346 B1
(45) Date of Patent: Jan. 31, 2012

(54) SYSTEMS AND METHODS FOR MAINTAINING SETTINGS FOR MULTIPLE APPLICATIONS

(75) Inventors: Jeremy Hurren, Pleasant Grove, UT (US); Cynthia Bringhurst, Springville, UT (US)

(73) Assignee: Symantec Corporation, Mountain View, CA (US)

( * ) Notice: Subject to any disclaimer, the term of this patent is extended or adjusted under 35 U.S.C. 154(b) by 526 days.

(21) Appl. No.: 12/147,939

(22) Filed: Jun. 27, 2008

(51) Int. Cl.
- G06F 7/00 (2006.01)
- G06F 17/00 (2006.01)
- G06F 17/30 (2006.01)

(52) U.S. Cl. .............. 707/636; 707/736
(58) Field of Classification Search .......... None
See application file for complete search history.

(56) References Cited

U.S. PATENT DOCUMENTS

2005/0187912 A1* 8/2005 Matsa et al. .......... 707/3
2006/0036570 A1* 2/2006 Schaefer et al. ......... 707/1

OTHER PUBLICATIONS

"Global Storage Settings panel," http://www.macromedia.com/support/documentation/en/flashplayer/help/settings_manager03.html, 2008.

* cited by examiner

*Primary Examiner* — Rehana Perveen
*Assistant Examiner* — Raheem Hoffler
(74) *Attorney, Agent, or Firm* — Advantedge Law Group

(57) ABSTRACT

A computer-implemented method for maintaining settings for multiple applications. The method may include identifying a request to retrieve a parameter of a setting of a first application. The request may identify a first location of the parameter. The method may also include retrieving the parameter from a second location and providing the parameter to the first application in response to the request. Other methods may include identifying a change to a first parameter of a setting of a first application. The method may reformat the first parameter, creating a second parameter formatted for a second application. The second parameter may be stored in a second location associated with the setting of the second application. A second application may request and access the second parameter. Various other methods, systems, and computer-readable media are also disclosed.

18 Claims, 7 Drawing Sheets

SYSTEMS AND METHODS FOR MAINTAINING SETTINGS FOR MULTIPLE APPLICATIONS

BACKGROUND

An increasing number of computer users work with multiple varieties of software of the same genre. For example, many users have several different web browsers on their personal computer. A user may prefer the compatibility of a particular web browser, but prefer the text rendering or speed of another.

Additionally, many people use multiple computers routinely: one computer at home and another computer at work. An employer may require a specific spreadsheet application, but an employee may prefer another spreadsheet application for use at home. Users may desire to share application settings for different software applications on one or more computers. Software companies with competing products have little incentive to design software to share preferences. Some products available to consumers have the ability to transfer settings from one application to another upon installation as a manually executed process.

Unfortunately, these products do not provide capabilities to dynamically share settings of several applications or on several different computers. They do not enable changes to settings in one software application to be automatically applied to similar software applications. Nor are they capable of automatically applying settings to multiple computers frequently accessed by a single user.

SUMMARY

As will be described in further detail below, the current disclosure relates to methods and systems for maintaining settings for multiple applications. In some embodiments, a virtualization driver may be used to intercept and redirect an attempt to read a setting. The request to read the setting may be redirected to a location where a setting for multiple applications is stored. The virtualization driver may reformat the setting, which may be a generic setting, into a format usable by the application that requested the setting. In other embodiments, a setting monitor may monitor setting changes for a first application and may provide the settings to, or make the settings accessible to, a second application.

In embodiments where a virtualization driver may be used to intercept and redirect attempts to read a setting, an application running on a computing device may request access to a parameter of a setting of the application. The request may be directed to a first location. In order to allow multiple applications to have the same settings, the parameter may be retrieved from a second location instead of the first location. In other words, the parameter may be provided to the first application from the second location in response to the request to access the parameter from the first location. Similarly, other applications running on the computing device may receive the parameter from the second location in response to requests made to access parameters of their respective settings. Thus, multiple applications may be provided with the same setting.

Another method for maintaining settings for multiple applications may comprise identifying a change to a first parameter of a setting of a first application. The first parameter may be stored in a first location. To create a second parameter formatted for use by a setting of a second application, a module may reformat the first parameter. The computing device may store the second parameter in a second location associated with the setting of the second application. This process may allow a change of a setting for a first application to result in an analogous change of a setting for another application.

As part of a third method, a module may identify a change made to a first parameter of a setting of a first application. A computing device may have stored the first parameter in a first location. To facilitate maintaining settings for multiple applications, a module may reformat the first parameter into a generic format, thereby creating a second parameter. The computing device may store the second parameter in a second location. A second application may later request access to a setting of the second application. The module may identify the request and may retrieve the second parameter that is formatted in the generic format. In order to provide the second parameter to the second application for use as the setting of the second application, the module may reformat the second parameter to make the second parameter usable as the setting of the second application.

Systems corresponding to the above methods are also disclosed. In addition, features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
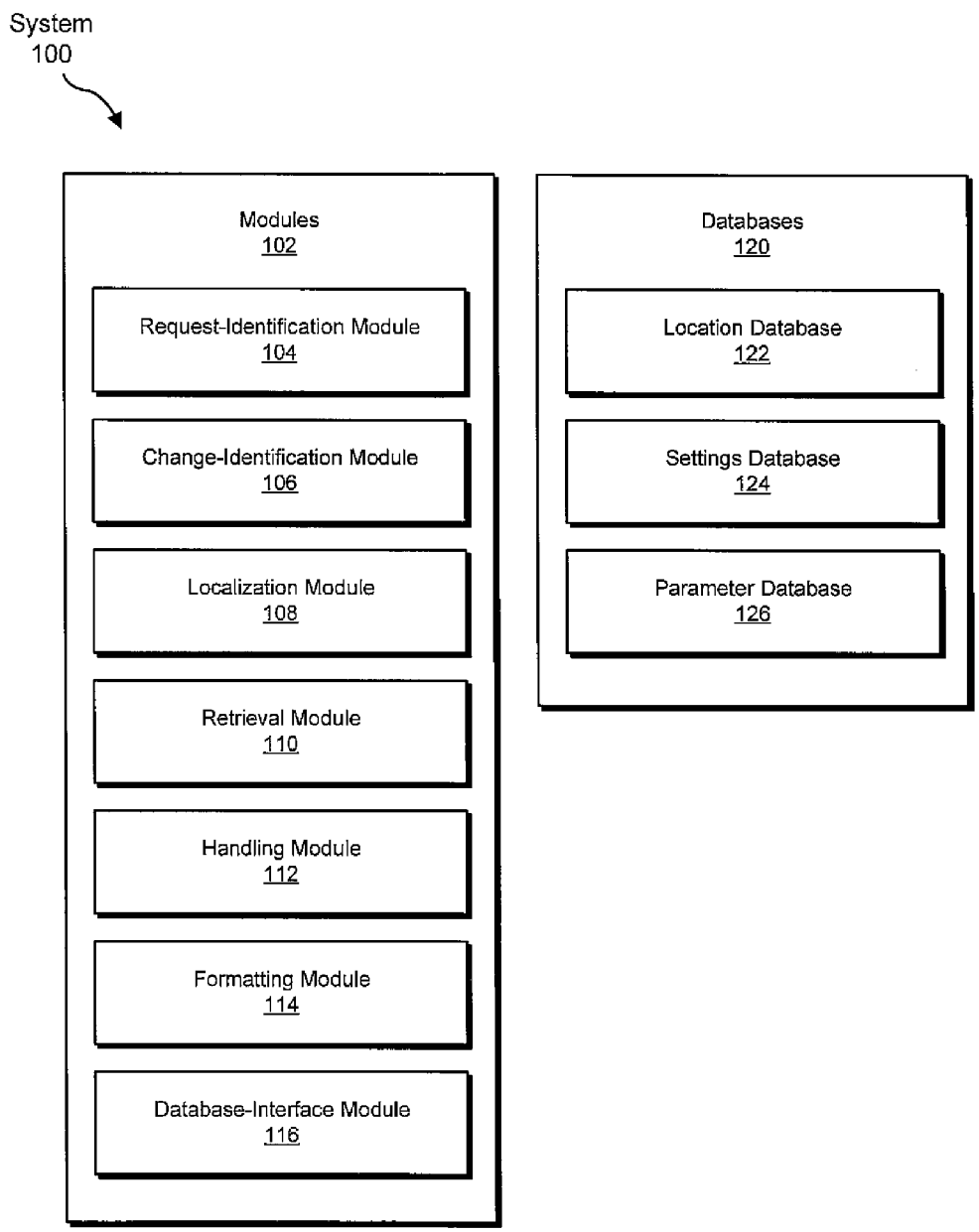
FIG. 1 is a block diagram of an exemplary system for maintaining settings for multiple applications according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the current disclosure covers all modifications, equivalents, and alternatives falling within the scope of the appended claims.

DETAILED DESCRIPTION

The instant disclosure generally relates to systems and methods for maintaining settings for multiple applications. Some embodiments may include methods to maintain settings for multiple applications by virtualizing the locations associated with parameters of the settings. Other embodiments may reformat setting parameters from a format associated with one application to a different format associated with another application. Additional embodiments may reformat a parameter of a setting from one application into a generic format, and then reformat the generically formatted parameter to another format when the parameter is requested by another application. Systems for maintaining settings for multiple applications are also discussed in connection with these methods. The methods and systems disclosed herein may allow a user to maintain consistent settings for multiple applications. As treated in greater detail below, the methods and systems disclosed herein may provide various other features and advantages.

Figure 2:
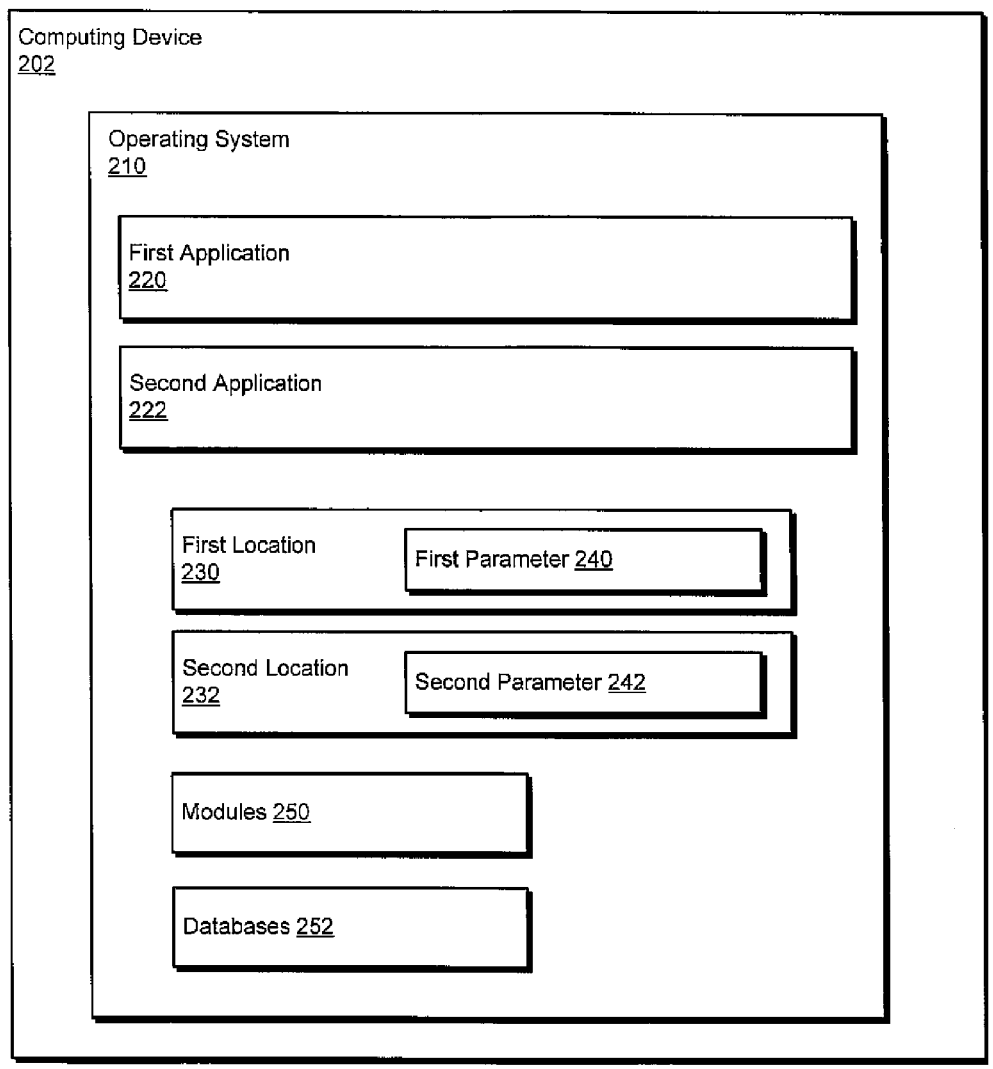
FIG. 2 is a block diagram of an exemplary computing device featuring a system for maintaining settings for multiple applications according to at least one embodiment.
Figure 3:
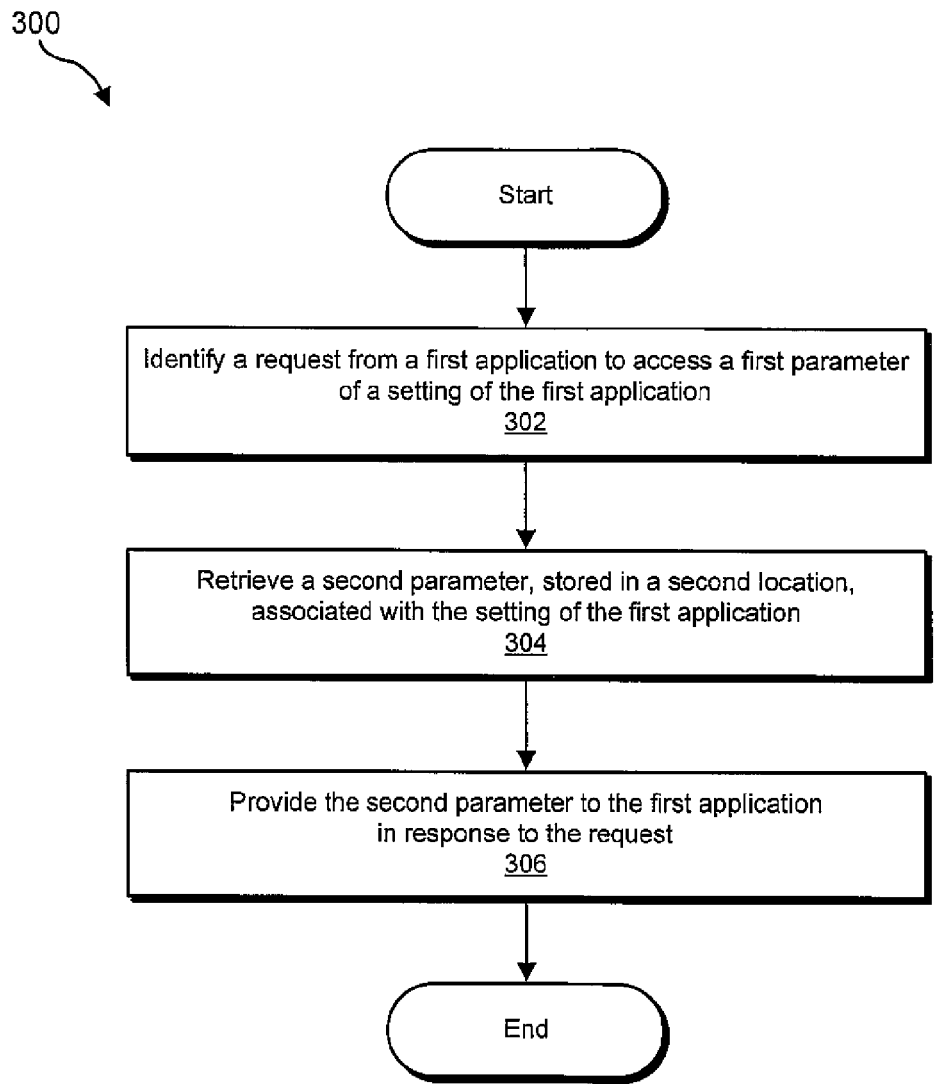
FIG. 3 is a flow diagram of an exemplary computer-implemented method for maintaining settings for multiple applications according to at least one embodiment.
Figure 4:
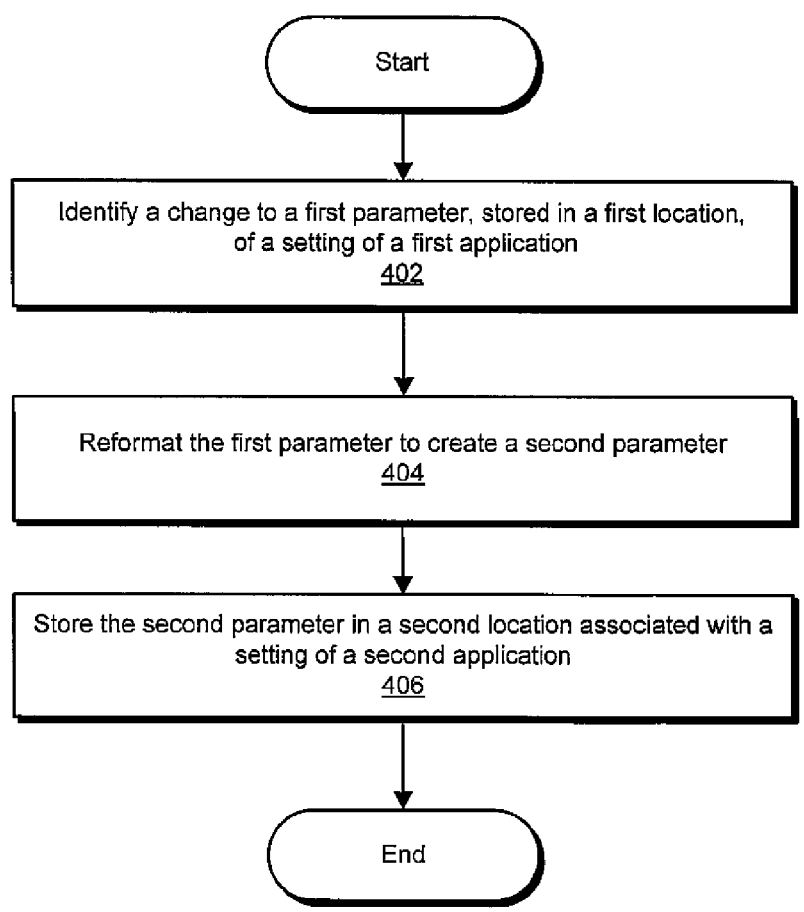
FIG. 4 is a flow diagram of an exemplary computer-implemented method for maintaining settings for multiple applications according to at least one embodiment.
Figure 5:
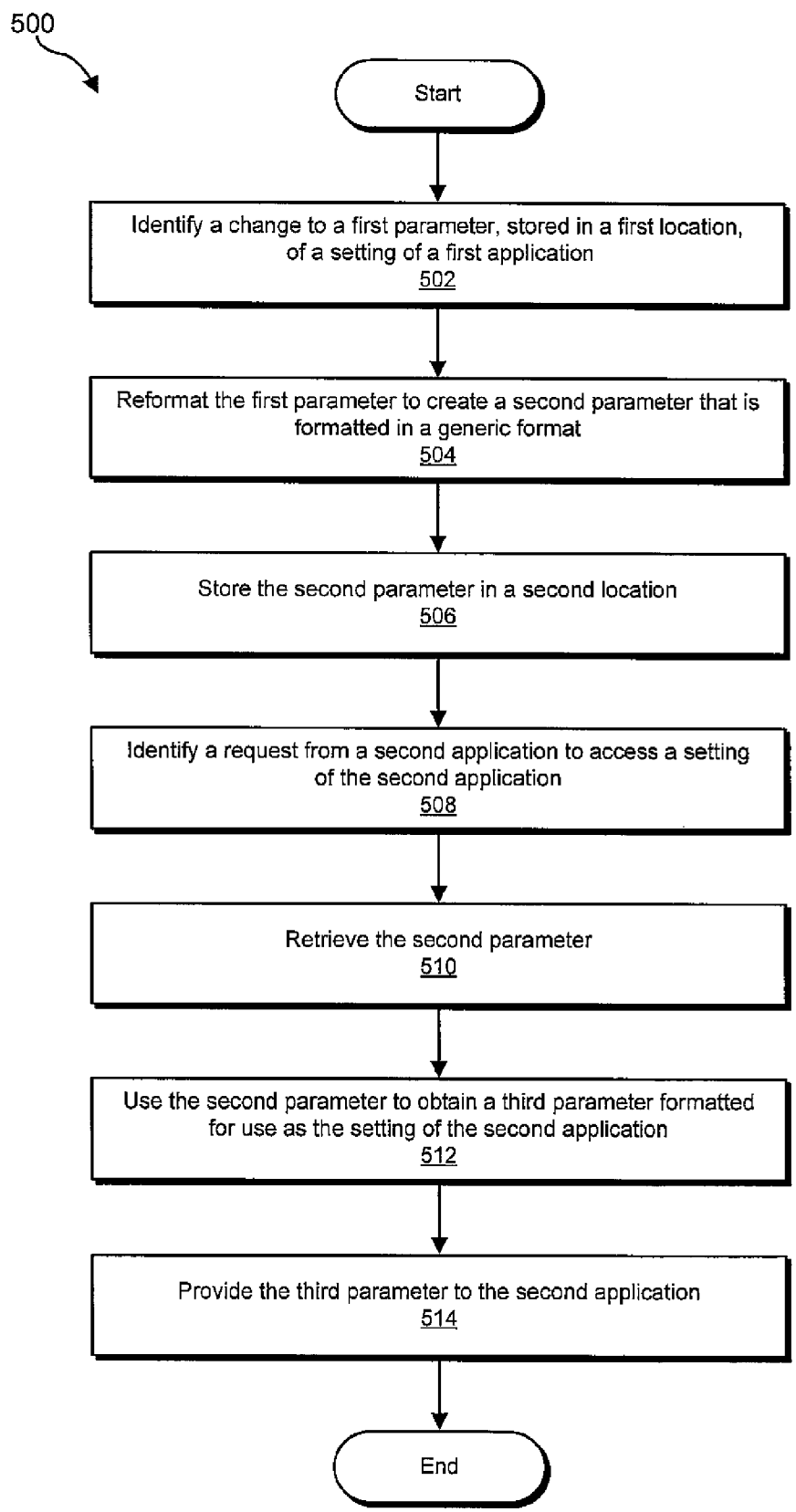
FIG. 5 is a flow diagram of an exemplary computer-implemented method for maintaining settings for multiple applications by applying a generic format according to at least one embodiment.

In the following disclosure, FIGS. 1, 3, and 4 provide an overview of exemplary embodiments for maintaining settings for multiple applications. FIG. 2 demonstrates an embodiment of a client computing device for use in maintaining settings for multiple applications. FIG. 5 illustrates a method for maintaining settings for multiple applications by reformatting a parameter in a first format into a generic format and reformatting the parameter in the generic format into a second format.

FIG. 1 illustrates a system 100 that may comprise modules 102 and databases 120. Modules 102 may include a request-identification module 104 that may be programmed to identify or intercept a request from an application to retrieve a parameter of a setting. A retrieval module 110 may retrieve the parameter. After the parameter has been retrieved, a handling module 112 may provide the parameter to the application in response to the request. Additionally, handling module 112 may be programmed to store parameters in locations selected or identified by a localization module 108.

Modules 102 may also include a change-identification module 106 that may be programmed to identify a change made by an application to a parameter of a setting of the application. A formatting module 114 may reformat the parameter from one format to another to allow a second application to use the parameter as a setting of the second application. In some embodiments, a database-interface module 116 may interact with one of databases 120 to facilitate maintaining settings for multiple applications. In some embodiments, the modules shown in FIG. 1 may be separate modules or software applications. In other embodiments, the functionality of one or more of the modules shown in FIG. 1 may be combined in a single module or software application.

Databases 120 may include several databases. A location database 122 may comprise locations of parameters. A settings database 124 may comprise a database of settings of applications, and a parameter database 126 may comprise parameters. Databases 120 may comprise sets of setting locations, settings, and/or parameters associated with a user.

A computing device 202, as illustrated in FIG. 2, may include modules 102 and databases 120 respectively as modules 250 and databases 252. Computing device 202 may be a desktop computer, a laptop, a workstation, a portable computing device, or any other suitable type of computing device.

An operating system 210 may run on computing device 202. Operating system 210 may be a WINDOWS operating system (e.g., WINDOWS XP, WINDOWS VISTA, etc.), a MACINTOSH operating system (e.g., MAC OS10), a UNIX operating system (e.g., AIX, SOLARIS, etc.), a LINUX operating system, or any other suitable operating system.

Several applications, such as first application 220 and second application 222, may run on operating system 210. First application 220 and second application 222 may be commercial applications, including such genres as word processors (e.g., WORD, OPENOFFICE WRITER, PAGES, etc.), spreadsheets (e.g., EXCEL, OPENOFFICE CALC, etc.), media players (e.g., ITUNES, WINDOWS MEDIA PLAYER, REALPLAYER, etc.), web browsers (e.g., FIREFOX, INTERNET EXPLORER, SAFARI, etc.), or any other type of commercial or non-commercial applications.

As shown in FIG. 2, a first location 230 may store a first parameter 240, and a second location 232 may store a second parameter 242. First parameter 240 and/or second parameter 242 may be values for settings. For example, first parameter 240 may be 8-point font, and second parameter 242 may be 12-point font. In some embodiments, first parameter 240 and/or second parameter 242 may be values that, when applied to a setting, provide a particular result. For example, a certain parameter for a setting (e.g., default font size in a word processing application) may result in a 14-point default font size.

FIG. 3 illustrates an exemplary computer-implemented method 300 for maintaining settings for multiple applications. The steps illustrated in FIG. 3 may be performed on computing device 202 shown in FIG. 2. A request-identification module 104 may identify a request from first application 220 to access first parameter 240 as a setting of first application 220 (step 302). The request may identify a first location 230 that may store first parameter 240. First location 230 may be the default location for the setting of first application 220.

Instead of providing first parameter 240 in response to the request, retrieval module 110 may access a second location 232 (e.g., a location that stores a parameter for use by multiple applications) in order to retrieve a second parameter 242 (step 304). In some embodiments, retrieving second parameter 242 may comprise redirecting the request to second location 232. At step 306, handling module 112 may provide second parameter 242 to first application 220 to use as the setting of first application 220.

As an example, a user may start a first application (e.g., a web browser) on computing device 202. As the application loads, it may request to retrieve a first parameter of a setting of the application from a first location. The setting may decide to load the new pages in a new tab or a new window. Instead of using the setting from the first location, localization module 108 may use first location 230 to identify a second location 232. Localization module 108 may map the first location to the second location. For example, localization module 108 may determine that the first location stores a tab setting for the browser, and based on this information may identify the second location, which may also store a tab setting for a browser. After finding the second location, handling module 112 may return a second parameter from the second location to the browser.

In some embodiments, the second parameter may not be formatted for use as the setting of the browser. In such embodiments, a formatting module 114 may reformat second parameter 242 for use with the browser. After reformatting, handling module 112 may provide the second parameter as described. In other embodiments, second parameter 242 may already be formatted for use with the browser.

Settings that are made available to multiple applications may be stored in a variety of locations. In some embodiments, the settings may be stored in a local database. In other embodiments, the settings may be stored in a remote database. The settings may also be stored in other local and remote locations.

FIG. 4 illustrates an exemplary computer-implemented method 400. A change-identification module 106 may identify a change to a first parameter 240 of a setting of a first application 220 (step 402). A formatting module 114 may reformat first parameter 240 to create a second parameter 242 (step 404) for use as a setting of a second application 222. A handling module 112 may store the second parameter 242 in a second location 232 that is associated with a setting of a second application 222 (step 406). In at least one embodiment, computer-implemented method 400 may terminate after step 406.

In at least one embodiment, the method may further comprise identifying the second application, the second application having a setting that is analogous to the setting of the first application. For example, if the first application is an EXCEL spreadsheet application, the method may identify an OPENOFFICE CALC spreadsheet application as a second application. A database-interface module 116 may select the second application from one of databases 252. The selection may be based on the genre of the first application and/or the genre of the setting of the application.

In other embodiments, computer-implemented method 400 may continue when change-identification module 106 identifies a request from second application 222 to retrieve second parameter 242. A retrieval module 110 may retrieve second parameter 242 from second location 232, which may be in one of databases 252. Databases 252 may be stored on a local computing device or a remote-computing device connected to computing device 202 by a network. Handling module 112 may provide second parameter 242 to second application 222 for use as the setting of second application 222.

Second application 222 may be an application of the same genre as first application 220. For example, first application 220 may be a FIREFOX web browser, and second application 222 may be an INTERNET EXPLORER web browser. The similarities of first application 220 and second application 222 may contribute to many analogous settings that can be maintained using computer-implemented method 400.

In some embodiments, a user may indicate that the user wants setting changes in a first application to be automatically copied to a second application. Thus, when a setting change is made in the first application, the change may also be copied to the second application.

In other embodiments, database-interface module 116 may automatically identify applications to which settings may be copied. For example, if a setting is changed in a first application, database-interface module 116 may identify a second application 222 that is related to the first application by searching databases 252. To identify an application related to the first application, database-interface module 116 may search for applications of the same genre as the first application. An application genre, as used herein, may refer to a type (e.g., word processor, spreadsheet, media player, web browser, etc.) of application. Thus, if the first application is a word processor, database-interface module 116 may search for other word processors.

According to various embodiments, instead of using an application genre to detect new applications, database-interface module 116 may search for additional applications by searching for applications that have a setting that is analogous to the setting that was just changed in the first application. For example, if the changed setting is a font color setting, database-interface module 116 may search for other applications that have a font color setting.

As another example, a user may change a parameter of a setting of FIREFOX. The parameter may indicate that FIREFOX should accept all cookies. A change-identification module may identify the change. A formatting module may reformat the parameter for use as a setting by INTERNET EXPLORER. A handling module may then store the reformatted parameter in a second location. The second location may be a location where INTERNET EXPLORER looks for cookie settings. In other embodiments, the second location may also be a parameter database stored on a local or remote computer.

To continue the previous example, the user may run INTERNET EXPLORER on a second computing device. INTERNET EXPLORER may make a request to access a parameter to determine how to handle cookies. In embodiments where the parameter is stored in a location where INTERNET EXPLORER looks for cookie settings, INTERNET EXPLORER may directly access the parameter. In other embodiments, a request-identification module may identify the request and may redirect the request to the location where the parameter is stored. Computer-implemented method 500 (FIG. 5) may allow a change to a setting of FIREFOX to be applied to a setting of INTERNET EXPLORER. In some embodiments, FIREFOX may be running on a different computer than INTERNET EXPLORER. In such embodiments, a setting for both FIREFOX and INTERNET EXPLORER may be stored on a network device accessible by either computer.

FIG. 5 illustrates a computer-implemented method 500 that may also run on computing device 202. Computer-implemented method 500 may begin when change-identification module 106 identifies a change to first parameter 240 of a setting of first application 220 (step 502). First location 230 may store first parameter 240. In order to facilitate access to the value represented by first parameter 240, a formatting module 114 may reformat first parameter 240 into a generic format, thereby creating a second parameter 242 (step 504).

In some embodiments, reformatting the first parameter into the generic format may be performed by a remote-computing device. A generic format may be a format that is not specific to any particular application, but may be reformatted or otherwise used as a setting for multiple applications. A handling module 112 may store second parameter 242 (i.e., the generic parameter) in a second location 232 (step 506). The second location may be in parameter database 126 associated with a user of first application 220. Parameter database 126 may be a database that is stored locally or remotely. For example, parameter database 126 may be a web-based database that stores a user's settings and allows the user to access the settings with different computing devices and from different locations.

Second application 222 may make a request to access a setting of second application 222. A request-identification module 104 may identify the request (step 508). If second location 232 is in parameter database 126 stored on the remote-computing device, a database-interface module 116, working with a retrieval module 110, may retrieve second parameter 242 (step 510). To allow second application 222 to use second parameter 242, a formatting module 114 may reformat second parameter 242 to create a third parameter (step 512). In step 514, handling module 112 may provide the third parameter to second application 222. After completing step 514, computer-implemented method 500 may terminate.

In some embodiments, a user may change a first parameter of a setting of a MICROSOFT WORD processor running on a computing device. The first parameter may be stored on the computing device. The user may change the setting to make "Courier" the default font in WORD documents. A change-identification module may identify the change. A formatting module may then reformat the first parameter to create a second parameter in a generic format. A handling module may store the second parameter in a second location in a parameter database on a remote-computing system, where the parameter may be accessed by other applications. In other embodiments, the first parameter may not be reformatted, but may still be made available to other applications.

Later, the user may start an OPENOFFICE WRITER word processor. OPENOFFICE WRITER may request access to a setting of OPENOFFICE WRITER that determines the default font for documents. A request-identification module may identify the request. OPENOFFICE WRITER may access the first parameter, or the reformatted second parameter, for use as the setting that determines the default font for documents.

In some embodiments, in order to allow OPENOFFICE WRITER to use the second parameter, a formatting module may reformat the second parameter. By reformatting the second parameter, the formatting module may create a third parameter that is formatted for use by OPENOFFICE WRITER as the setting for the default font. In other embodiments, the third parameter may be obtained by retrieving the third parameter from a parameter database. For example, a retrieval module may retrieve the third parameter (e.g., a parameter that sets "Courier" as the default font) from a database with parameters that are formatted for use with OPENOFFICE WRITER. By using the third parameter, the default font in OPENOFFICE WRITER may be set to "Courier."

By using the methods and systems described above, settings may be maintained for multiple applications. The settings may be maintained for multiple applications on several computing devices. The settings may also be associated with a user, which may allow settings to be imported from a database on a remote-computing device to various different types of computing devices. While particular applications, settings, and computing devices have been described herein, embodiments of the instant disclosure may apply to any suitable applications, settings, and/or computing devices.

Figure 6:
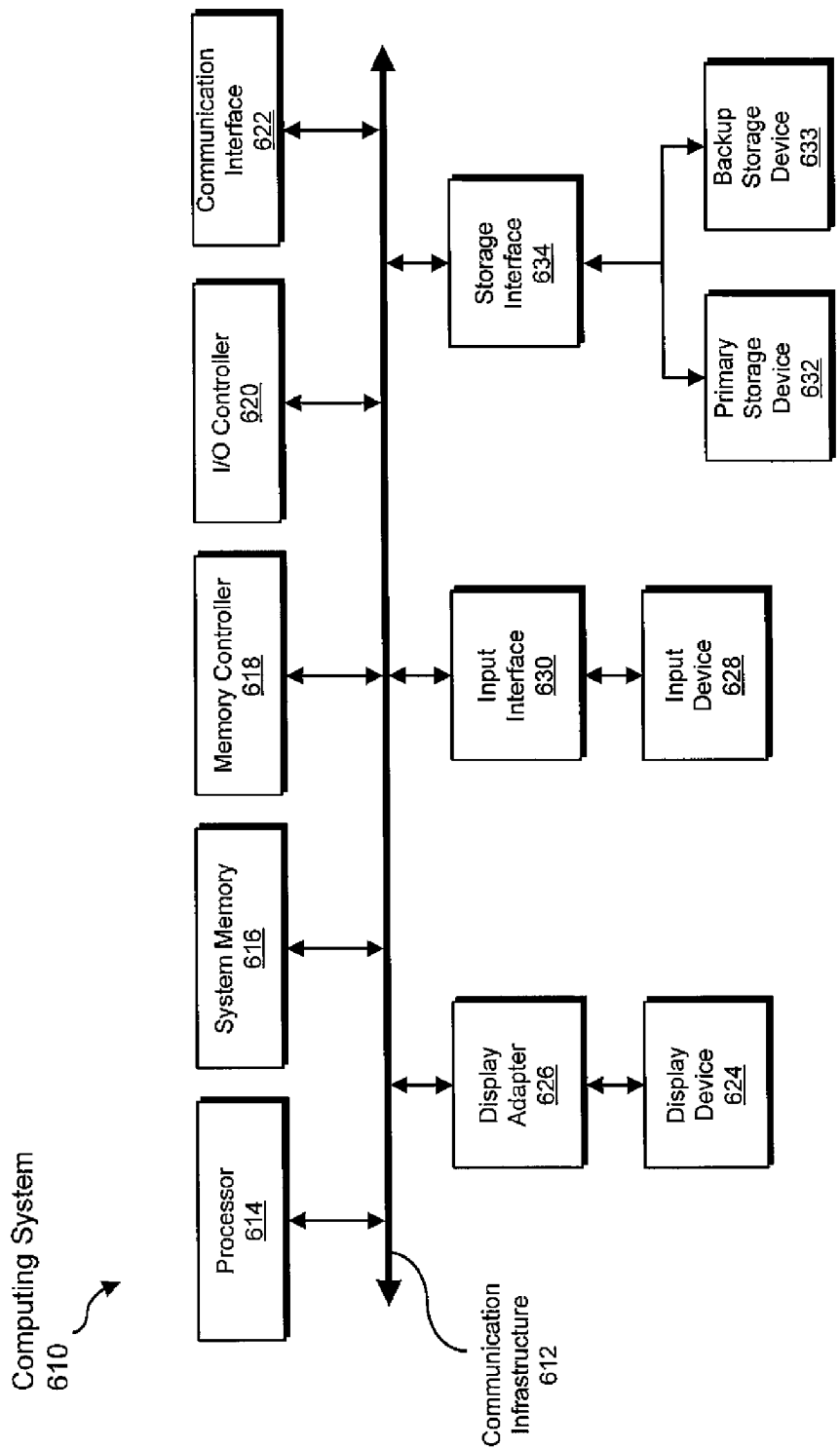
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor-computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, reformatting, storing, retrieving, using, providing, and redirecting steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (e.g., system memory 616) and a non-volatile storage device (e.g., primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, reformatting, storing, retrieving, using, providing, and redirecting.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for identifying, reformatting, storing, retrieving, using, providing, and redirecting steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (e.g., an Ethernet network), a personal area network (e.g., a BLUETOOTH network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, reformatting, storing, retrieving, using, providing, and/or redirecting steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, reformatting, storing, retrieving, using, providing, and/or redirecting steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, the exemplary file systems disclosed herein may be stored on primary storage device 632, while the exemplary file-system backups disclosed herein may be stored on backup storage device 633. Storage devices 632 and 633 may also be used, for example, to perform and/or be a means for performing, either alone or in combination with other elements, one or more of the identifying, reformatting, storing, retrieving, using, providing, and redirecting steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
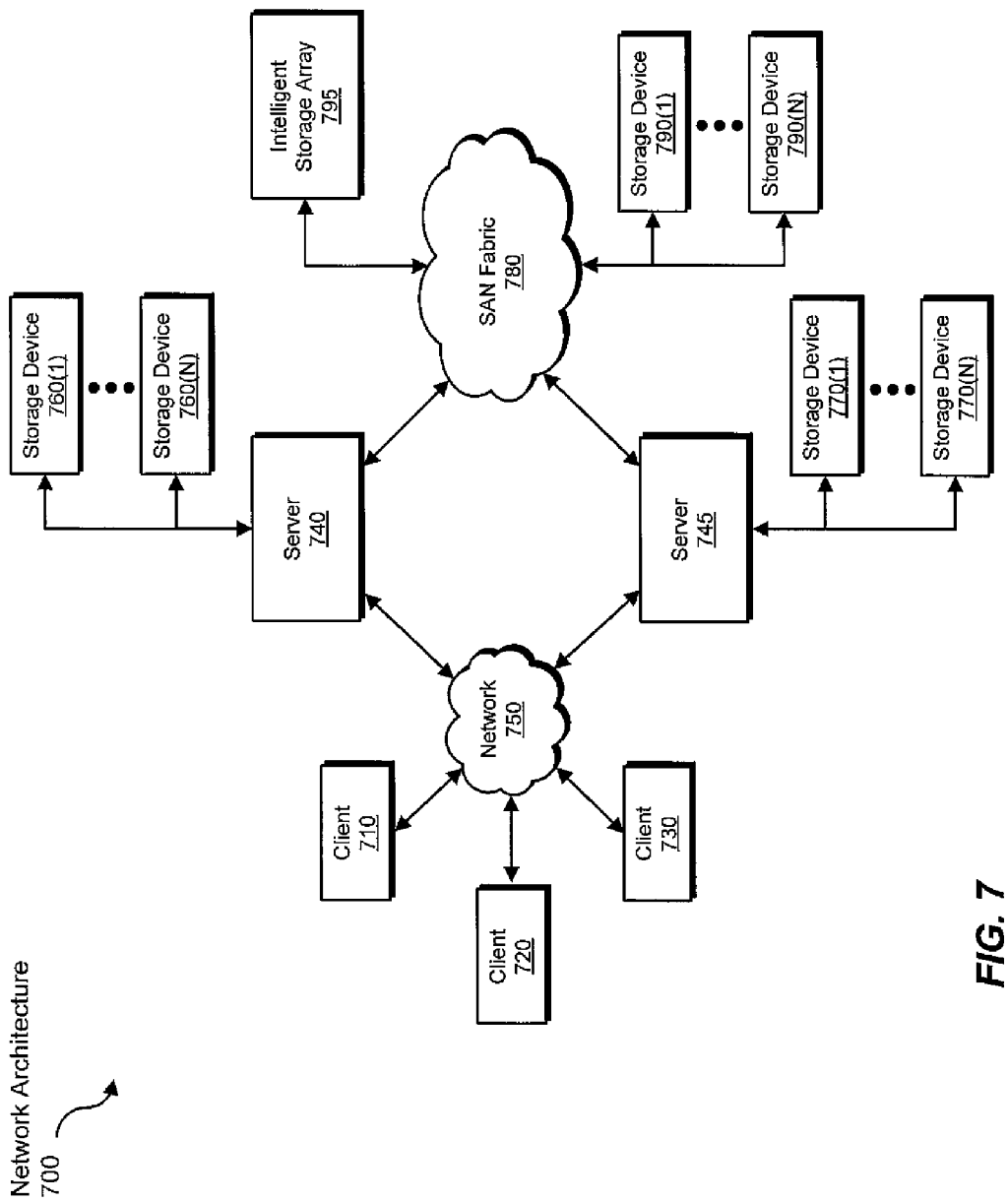
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

Accordingly, network architecture 700 may perform and/or be a means for performing, either alone or in combination with other elements, one or more of the identifying, reformatting, storing, retrieving, using, providing, and redirecting steps disclosed herein. Network architecture 700 may also be used to perform and/or be a means for performing other steps and features set forth in the instant disclosure.

As detailed above, computing system 610 and/or one or more of the components of network architecture 700 may perform and/or be a means for performing, either alone or in combination with other elements, one or more steps of the exemplary methods described and/or illustrated herein. For example, a computer-implemented method for maintaining settings for multiple applications may comprise identifying a request to retrieve a parameter of a setting of an application. The request may identify a first location. In order to provide the parameter to the first application, the parameter may be retrieved from a second location.

In at least one embodiment, retrieving the parameter from the second location may comprise redirecting the request to the second location. Retrieving the parameter from the second location may comprise querying a database stored on a local computing device and/or a remote-computing device. The database may comprise a set of settings associated with a user of the first application.

The parameter may not be formatted for use as the setting of the first application. Accordingly, providing the parameter to the first application may comprise reformatting the parameter for use as the setting of the first application. In some embodiments, the first location may comprise a registry key of a registry of a first computing device.

As an additional example, a computer-implemented method for maintaining settings for multiple applications may comprise identifying a change to a first parameter of a setting of a first application. The first parameter may be stored in a first location. To allow a second application to access the first parameter, the method may reformat the first parameter to create a second parameter. The second parameter may be formatted for a setting of the second application. The method may then store the second parameter in a second location, which may be associated with the setting of the second application.

The method may further comprise identifying a request from the second application to access the second parameter of the setting of the second application. A module may retrieve the second parameter associated with the setting of the second application. The method may then provide the second parameter to the second application in response to the request from the second application.

In some embodiments, the method may comprise identifying a second application with a setting that is analogous to the setting of the first application. Identifying the second application may further comprise identifying a database of applications and selecting the second application from the database. The selection may be based on the genre of the first application and/or the genre of the setting of the first application. In at least one embodiment, the first application may run on a first computing device associated with a user, and the second application may run on a second computing device that is also associated with the user. The first application and the second application may be web browsers. Storing the second parameter in a second location may comprise storing the second parameter in a database that is stored on a remote computing device and/or a local computing device.

Another computer-implemented method for maintaining settings for multiple applications may comprise identifying a change to a first parameter of a setting of a first application, the first parameter being stored in a first location. A module may reformat the first parameter to create a second parameter, the second parameter being formatted in a generic format. The second parameter may then be stored in a second location. Storing the second parameter may comprise storing the second parameter in a database that is accessible through a website and/or associated with a user of the first application and the second application.

In at least one embodiment, the method may further comprise identifying a request from a second application to access a setting of the second application. The method may then retrieve the second parameter, wherein the second parameter is not formatted for use as the setting of the second application. The second parameter may be used to create a third parameter having the same value as the second parameter. A module may then provide the third parameter to the second application in response to the request to access the setting of the second application.

Using the second parameter to create the third parameter may comprise retrieving the third parameter from a database and may also comprise reformatting the second parameter. Reformatting of the first parameter and the second parameter may be performed by a remote-computing device and/or a local computing device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for maintaining settings for multiple applications, the method comprising:
   identifying a request from a first application to retrieve a parameter of a setting of the first application, the request identifying a first location associated with the setting;
   mapping the first location to a second location such that requests directed to the first location are redirected to the second location;
   in response to the request that identifies the first location associated with the setting:
      retrieving the parameter from the second location that stores the parameter for use by multiple applications instead of retrieving the parameter from the first location, wherein the parameter from the second location is not formatted for use as the setting of the first application;
      reformatting the parameter for use as the parameter for the setting of the first application;
      providing the parameter to the first application in response to the request to retrieve the parameter.

2. The computer-implemented method of claim 1, wherein:
   identifying the request to retrieve the parameter of the setting of the first application comprises intercepting the request to retrieve the parameter of the setting of the first application;
   retrieving the parameter from the second location comprises redirecting the request to the second location;
   the intercepting and redirecting are performed by a virtualization driver.

3. The computer-implemented method of claim 1, further comprising:
   identifying a request to access a setting of a second application, wherein:
      the second application is different than, but in the same genre as, the first application;
      the setting of the second application is analogous to the setting of the first application;
   retrieving the parameter from the second location that stores the parameter for use by multiple applications;
   providing the parameter to the second application.

4. The computer-implemented method of claim 3, wherein:
   retrieving the parameter from the second location comprises querying a database stored on at least one of:
      a local computing device;
      a remote computing device;
   the database comprises a set of settings associated with a user of the first application and maintained for use by the multiple applications to provide consistent settings among the multiple applications.

5. The computer-implemented method of claim 1, wherein the first location comprises a registry key of a registry of a first computing device.

6. A computer-implemented method for maintaining settings for multiple applications, the method comprising:
   identifying a change to a first parameter of a setting of a first application, wherein the first parameter is stored in a first location and the first parameter is not formatted for use as a setting of a second application;
   reformatting the first parameter to create a second parameter, the second parameter being formatted for the setting of the second application;

storing the second parameter in a second location, the second location being associated with the setting of the second application.

7. The computer-implemented method of claim 6, further comprising:
identifying a request from the second application to retrieve the second parameter of the setting of the second application;
retrieving the second parameter associated with the setting of the second application;
providing the second parameter to the second application in response to the request from the second application.

8. The computer-implemented method of claim 6, further comprising:
in response to identifying the change to the first parameter of the setting of the first application, identifying the second application during a search for applications that have settings that are analogous to the setting of the first application.

9. The computer-implemented method of claim 8, wherein identifying the second application comprises automatically identifying one or more applications to which changes in settings of the first application are to be copied by:
identifying a database of applications;
identifying a genre of the first application;
searching the database of applications for an application within the same genre as the first application;
during the search of the database, identifying the second application as an application within the same genre as the first application.

10. The computer-implemented method of claim 6, further comprising:
determining that a user has indicated that settings changes in the first application are to be automatically applied to the second application, wherein the identifying, reformatting, and storing are performed in response to the determining.

11. The computer-implemented method of claim 10, wherein storing the second parameter in the second location comprises storing the second parameter in a default location where the second application looks for the settings.

12. The computer-implemented method of claim 6, wherein storing the second parameter in the second location comprises storing the second parameter in a database that is stored on a local computing device.

13. A computer-implemented method for maintaining settings for multiple applications, the method comprising:
identifying a change to a first parameter of a setting of a first application, the first parameter being stored in a first location;
reformatting the first parameter to create a second parameter, the second parameter being formatted in a generic format;
storing the second parameter in a second location;
mapping the second location to a default setting location for a second application such that requests from the second application directed to the default setting location are redirected to the second location.

14. The computer-implemented method of claim 13, further comprising:
identifying a request from a second application to retrieve a setting of the second application;
retrieving the second parameter, wherein the second parameter is not formatted for use as the setting of the second application;
using the second parameter to obtain a third parameter that is formatted for use as the setting of the second application, the third parameter having the same value as the first and second parameters;
providing the third parameter to the second application in response to the request to retrieve the setting of the second application.

15. The computer-implemented method of claim 14, wherein using the second parameter to obtain the third parameter comprises retrieving the third parameter from a database.

16. The computer-implemented method of claim 14, wherein using the second parameter to obtain the third parameter comprises reformatting the second parameter for use as the setting of the second application.

17. The computer-implemented method of claim 13, wherein:
the generic format is not specific to any particular application but may be reformatted as a setting for multiple applications from different software companies.

18. The computer-implemented method of claim 13, wherein:
the second location comprises a parameter database associated with a user of the first application and at least one additional applications for which the second parameter may be reformatted.

* * * * *